3,037,049
PROCESS FOR ESTERIFYING BENZENE
DICARBOXYLIC ACIDS
Alexander A. Vaitekunas, New Haven, Conn., assignor to Olin Mathieson Chemical Corporation, New Haven, Conn., a corporation of Virginia
No Drawing. Filed Jan. 28, 1960, Ser. No. 5,106
4 Claims. (Cl. 260—475)

This invention relates to a novel and efficient process for converting benzene dicarboxylic acids to glycol esters thereof. More particularly, this invention provides an improved process for the preparation of bis-hydroxyalkyl esters of terephthalic acid, isophthalic acid or mixtures thereof by reaction with ethylene oxide or other lower alkylene oxides under novel conditions and environment, enabling the rapid and efficient production of the desired ester.

These monomeric esters may be readily converted to polymers such as polyethylene terephthalate suitable for the preparation of strong films and fibers, as well as for the preparation of coating compositions and of plastic molding compositions.

The polyalkylene terephthalates and similar polyesters have generally been prepared by rather complex procedures, involving first the preparation and purification of lower alkyl esters, and then the transesterification thereof with a glycol, followed by polymerization.

While various proposals have been made to simplify the foregoing procedure by initially converting the acid to the glycol ester directly, it has not been possible heretofore by such expedients to produce on a commercial scale polyester of adequate quality.

Thus, prior proposals for the formation of glycol esters by the reaction of alkylene oxide with dibasic acid have been uneconomical in requiring the use of a large excess of alkylene oxide, which could not readily be recovered for re-use in the process. In some cases, part of the alkylene oxide reacted to form undesired impurities in the product, by oxyalkylation thereof or of intermediate compounds, deleteriously affecting the properties of the polyester.

The main object of this invention has been the provision of an efficient process for converting benzene dicarboxylic acids, particularly terephthalic and isophthalic acids, directly to glycol esters by means of an alkylene oxide. Other objects have included the provision of a process of the above type wherein the formation of by-product impurities is minimized, and the provision of reaction conditions such that the formation of the desired ester is accelerated. A further object has been to provide a direct esterification process of this type wherein a purified ester product is readily obtainable. Other objects will be apparent from the following detailed description.

In accordance with the present invention, the direct esterification of terephthalic and other dibasic acids by means of alkylene oxides is readily accomplished by carrying out the reaction in the presence of an inert volatile organic liquid characterized by poor solvent power for the dibasic acid and as a good solvent for the ester product.

The preferred organic liquid media are ketones containing four to six carbon atoms, such as methyl ethyl ketone, methyl isopropyl ketone, diethyl ketone, cyclohexanone and methyl isobutyl ketone, and cyclic ethers, such as dioxane. These possess the desired properties of inertness, i.e., non-reactivity with alkylene oxides, proper volatility, poor solvent power for the acids and low viscosity. The volatility, corresponding to a normal boiling point range of about 80° to 120° C., is such as to preclude the need for maintaining excessive pressures during the reaction and to facilitate separation by vaporization of the liquid from the ester product.

Certain advantageous features in accordance with the invention are likewise obtainable with the use of other ketones and ethers and of alkyl aromatic hydrocarbons, having a normal boiling point not higher than about 150° C. and not lower than about 50° C. Thus, acetone, methyl isoamyl ketone, ethyl butyl ketone, isopropyl ether, dibutyl ether, toluene or xylene may be used to advantage as the liquid reaction medium.

The dibasic acid, preferably in finely-divided or powdered form, is readily suspended by agitation with about 2 to 6, preferably about 3 to 4, times its weight of a liquid or mixture of liquids, as defined above. The resulting suspension is sufficiently fluid to be readily maintained by agitation at the reaction temperature. Also, operating within the stated proportions generally assures the crystallization of part of the ester product on cooling of the reaction solution. The isolated crystalline product is readily freed of solvent by volatilization of the latter, while the filtrate can be re-cycled for use in the esterification reaction.

An esterification catalyst is used, preferably consisting of a tertiary amine such as pyridine, which forms a salt with the dibasic acid that is soluble in the liquid organic medium, preferred catalysts being tri-n-propyl amine and N,N'-dimethyl aniline. The amount of catalyst may vary from 0.5 to 5% by weight of the terephthalic or other dibasic acid present, 2 to 4% being preferred.

The esterification should be carried out at a temperature from about 80° to about 145° C., preferably at 100–110° C., for a period of about 1 to 3 hours.

Usually, it is desirable to maintain the temperature at above the normal boiling point of the reaction mixture, which is kept at a pressure of about 150–350 pounds per square inch gauge to keep the reaction medium in the liquid phase, by means of added nitrogen or other inert gas.

The desired amount of alkylene oxide, about 1.7 to 2.1 moles per mole of terephthalic acid or other dibasic acid, is dissolved in the liquid medium or added as a liquid under pressure. The suitable alkylene oxides are those containing 2 to 6 carbon atoms, particularly ethylene oxide, propylene oxide and butylene oxide.

The following examples provide illustrative embodiments in accordance with the invention. Unless otherwise stated, parts are given by weight.

*Example 1*

A slurry of 50 parts of commercial grade terephthalic acid (85–90% terephthalic acid, 5% isophthalic and essentially the balance p-toluic acid), 159 parts of methyl ethyl ketone containing 26.7 parts of dissolved ethylene oxide and 2.0 parts of tri-n-propyl amine was placed in an autoclave equipped with a stirrer, temperature regulator and gas inlet tube. After displacing the air by nitrogen, the stirred reaction mixture was heated to 110° C. and this temperature was maintained, together with a nitrogen pressure of 225 p.s.i.g., during a period of two hours. The hot reaction mixture was filtered from the unreacted terephthalic acid (2.5 parts). The filtrate upon cooling to 10° C., gave 50.0 parts of bis(beta-hydroxyethyl) terephthalate, which was removed by filtration. The filtrate can be reused for esterification or the solvent removed by distillation. In the latter case, an additional 12 parts of the bis ester are recovered. Thus, the total amount of bis ester formed was 62 parts or 94.5% based on the pure terephthalic acid used. The bis ester is purified using conventional recrystallization methods to have a melting point of 110.4° C. and saponification number of 443, and is suitable for polymerization.

Twenty parts of thus prepared bis(beta-hydroxyethyl)

terephthalate was heated for 4 hours at 275° C. in the presence of 0.05% of zinc acetate dihydrate as the catalyst and at 0.4 mm. Hg pressure of nitrogen. Polyethylene terephthalate of an intrinsic viscosity of 0.65 which could be easily drawn to fibers was obtained.

Example 2

A slurry of 50.0 parts of commercial grade terephthalic acid (85–90% terephthalic acid), 158.0 parts of methyl isobutyl ketone which contained 26.7 parts of dissolved ethylene oxide and 2.0 parts of tri-n-propyl amine was placed in an autoclave as described in Example 1. The reaction mixture was heated to and maintained at 110° C., while increasing the nitrogen pressure to 225 p.s.i.g. for 2 hours. Hot filtration (110° C.) yielded 7.2 parts of unreacted terephthalic acid. Upon cooling to 10° C., 42 parts of the bis ester crystallized out. The filtrate can be recycled or the solvent removed under reduced pressure (48°–50° C./15 mm. Hg), yielding an additional 15.5 parts of the bis ester. Thus the total amount of bis(B-hydroxyethyl)terephthalate produced was 57.5 parts or 85% of the theoretical. Ester which was recrystallized from hot water displayed a melting point of 110.4° C. and saponification number of 443.0 (theoretical —440.6).

Example 3

A slurry of 50.0 parts of commercial grade terephthalic acid (85–90% terephthalic acid), 2 parts of tri-n-propyl amine, 202 parts of p-dioxane which contained 26.7 parts of dissolved ethylene oxide, was placed in an autoclave as described in Example 1. It was heated to 110° C. This temperature and 225 p.s.i.g. nitrogen pressure were maintained, while vigorously stirring, for 2 hours, the terephthalic acid going into solution as the reaction proceeded. Upon cooling the mixture to 5° C. 43 parts of the bis ester crystallized out. The filtrate could be recycled, or upon the removal of solvent by distillation, 25.5 additional parts of the bis ester were recovered. Thus, the yield per pass of bis(B-hydroxyethyl)terephthalate was 68.5 parts or 96.5% based on pure terephthalic acid used.

Example 4

A slurry of 50.0 parts of commercial grade terephthalic acid (85–90% terephthalic acid), 2 parts of N,N'-dimethyl aniline and 170 parts of toluene containing 26.7 parts of dissolved ethylene oxide, was placed in an autoclave as described in Example 1. The reaction mixture was heated to 120° C. and this temperature maintained for 2 hours while stirring. To keep the reactants in the liquid phase nitrogen pressure of 300 p.s.i.g. was maintained. The solvent was decanted and the residue was extracted with 350 parts of water at 80° C. Ten and one-half parts of terephthalic acid was recovered by filtration of the hot aqueous mixture. Upon cooling of the filtrate to 5° C., 52.0 parts of the bis ester crystallized out, corresponding to a yield of 77% based on pure terephthalic acid present.

Example 5

A slurry of 50.0 parts of terephthalic acid (99% terephthalic acid, less than 1% isophthalic and traces of p-toluic acid), 158.0 parts of methyl ethyl ketone, 2 parts of tri-n-propyl amine and 35.0 parts of propylene oxide was placed in an autoclave as described in Example 1. The reaction mixture was heated to 110° C. and this temperature maintained for 2 hours while vigorously stirring. As the reaction progressed, nitrogen pressure was slowly increased to 325 p.s.i.g. in order to maintain the reactants in the liquid phase. Twenty parts of unreacted terephthalic acid were separated on filtration of the hot mixture. Upon cooling the filtrate to 5° C., 45.0 parts of crude bis(B-hydroxypropyl)terephthalate were obtained corresponding to a yield of 56% per pass. After recrystallization from hot water, the product melted at 134–135° C. and was found to have a saponification number of 395 (theoretical-397).

Example 6

A slurry of 50 parts of commercial grade isophthalic acid (98% isophthalic acid, and 2% terephthalic acid), 159.9 parts of methyl ethyl ketone, 26.7 parts of ethylene oxide and 2.0 parts of tri-n-propylamine was placed in a stainless steel autoclave equipped with a stirrer, temperature regulator and gas inlet tube. After the air was replaced with nitrogen, the reaction mixture was heated to 110° C. and this temperature maintained for 2½ hours while stirring and increasing the nitrogen pressure to 325 p.s.i.g. Then, the reaction mixture was cooled to room temperature, the autoclave opened and its contents poured into a distillation flask. The solvent was removed by distillation and the residue upon cooling to 5° C. with occasional stirring gave 80.0 parts of crude (beta-hydroxyethyl) isophthalate. This was dissolved in 60 ml. of methylene chloride at 40° C., and on cooling to 5° C., the solution yielded a first crop (56.0 g.) of pure bis (beta-hydroxyethyl) isophthalate displaying a melting point of 78.6°, and a second crop of the crystalline ester, M.P. 77–78° C. was obtained from the filtrate after retaining for 16 hours at 5° C. Thus, 72.0 parts by weight of the crystalline ester were obtained (95% of theoretical yield).

Example 7

A slurry of 50.0 parts of commercial grade isophthalic acid (98% isophthalic acid), 155 parts of acetone, 26.7 parts of ethylene oxide and 2.0 parts of N,N-dimethyl-aniline was placed in an autoclave as described in Example 6, heated to 100° C., while increasing nitrogen pressure to 600 p.s.i.g. This temperature and nitrogen pressure were maintained for 3 hours while vigorously stirring. Then the autoclave was cooled to 30°–40° C., the pressure slowly released and 100.0 g. of solvent was removed by distillation. Upon cooling the residue to 5° C., 74.0 parts of crude bis ester were obtained. This was dissolved at 40° C., in 100.0 g. of methylene chloride and cooled to 5° C. The crystals being washed with hot benzene and dried to constant weight. The pure product consisted of 64.0 parts of snow white bis (beta-hydroxyethyl) isophthalate melting at 78.0° C., the yield being 89% of theoretical.

Example 8

A slurry of 50 parts of commercial grade isophthalic acid (98% isophthalic acid), 173.0 parts of toluene, 26.7 parts of ethylene oxide and 2.0 parts of N,N-dimethyl-aniline was placed in an autoclave as described in Example 6. The reaction mixture was heated to 110° C. and this temperature maintained for 3 hours while increasing the nitrogen pressure to 250 p.s.i.g. Then the reaction mixture was cooled to room temperature, pressure released, and the contents were poured into a glass container. The solvent was decanted and the residue treated with 100.0 g. of methylene chloride. The undissolved isophthalic acid (12.0 parts) was removed by filtration and the filtrate on standing gave 55.0 parts of crude bis(beta-hydroxyethyl) isophthalate. The yield per pass was 75% of the theoretical.

Example 9

A slurry of 50.0 parts of mixed phthalic acids (containing 50% terephthalic and 50% isophthalic acid), 159.0 parts of methyl ethyl ketone, 2 parts of tri-n-propylamine and 26.7 parts of ethylene oxide were placed in an autoclave as described in Example 6. The reaction mixture was heated to 110° C. and this temperature maintained for 2 hours. The nitrogen pressure was increased to 325 p.s.i.g. and a vigorous stirring was maintained during the whole reaction period. Then the reaction mixture was cooled to room temperature and 12 parts of precipitated bis(beta-hydroxyethyl) terephthalate was removed by filtration. The solvent was removed from the filtrate by distillation and the residue cooled to 5° C. A crystalline substance was obtained (64.0 parts) which was triturated with 320 parts of methylene chloride at 5° C. The undissolved residue amounted to 24.0 parts and was recrystallized from 120 ml. of hot distilled water, yielding 18.0 parts of pure bis(beta-hydroxyethyl) terephthalate. The total yield of pure bis(beta-hydroxyethyl) terephthalate was 30.0 parts (82% of theoretical).

The methylene chloride filtrate, after removal of the solvent by distillation, yielded a crystalline residue amounting to 42.0 parts. This was recrystallized from 100 ml. of methylene chloride-benzene (90:10 by volume) giving 28.0 parts (76% of theoretical) of purified bis (beta-hydroxyethyl) isophthalate which melted at 78° C. and displayed a saponification number of 443.0 and terephthalate content of 0.45% by polarigraphic analysis.

Similarly, the esterification of other benzene dicarboxylic acids with alkylene oxides containing up to 6 carbon atoms can be effected readily and advantageously at high rates and yields, with the obtainment of the desired glycol ester, by carrying out the reaction in the presence of the inert ketone or other liquid medium as set forth above. While particularly advantageous in the esterification of terephthalic and isophthalic acids, the novel process is likewise desirable in the esterification of the monomethyl- and dimethyl-substituted phthalic acids.

I claim:

1. In the esterification of a benzene dicarboxylic acid with an alkylene oxide having two to six carbon atoms, the process comprising suspending the acid in about 2 to 6 times its weight of an inert organic liquid medium chosen from the group consisting of ketones, ethers and alkylbenzenes, said liquid being a non-solvent for said acid and having a normal boiling point not higher than about 150° C. and not lower than about 50° C., providing in said suspension 1.7 to 2.1 moles of said alkylene oxide per mole of said acid and a tertiary amine catalyst amount to about 0.5 to 5% by weight of said acid, said amine forming a salt with said acid which is soluble in the organic medium, and stirring said suspension at a temperature of 80° to 145° C. for about 1 to 3 hours under inert gas pressure sufficient to maintain said medium in the liquid phase.

2. The process in accordance with claim 1, wherein the said liquid medium consists essentially of a ketone having 4 to 6 carbon atoms.

3. In the esterification of terephthalic acid with ethylene oxide, the process comprising suspending the acid in about 3 to 4 times its weight of a ketone having 4 to 6 carbon atoms, said ketone being a non-solvent for said acid providing in said suspension about 1.7 to 2.1 moles of ethylene oxide per mole of said acid and a tertiary amine catalyst selected from the group consisting of tri-n-propyl amine and $N,N^1$-dimethyl aniline, amounting to about 2 to 4% by weight of said acid, said amine forming a salt with said acid which is soluble in the organic medium, stirring said suspension at a temperature of about 100° to 110° C. for about 1 to 3 hours under inert gas pressure sufficient to maintain said ketone in the liquid phase, and recovering bis(beta-hydroxyethyl) terephthalate from the said suspension.

4. In the esterification of a terephthalic acid and isophthalic acid mixture, the process comprising suspending said acid mixture in about 3 to 4 times its weight of a ketone having 4 to 6 carbon atoms, said ketone being a non-solvent for said acids, providing in said suspension about 1.7 to 2.1 moles of ethylene oxide per mole of said acid and a tertiary amine catalyst selected from the group consisting of tri-n-propyl amine and $N,N^1$-dimethyl aniline, amounting to about 2 to 4% by weight of said acid, said amine forming a salt with said acid which is soluble in the organic medium, stirring said suspension at a temperature of about 100° to 110° C. for about 1 to 3 hours under inert gas pressure sufficient to maintain said ketone in the liquid phase, cooling the reaction mixture to crystallize terephthalate ester, separating said ester and recovering isophthalate ester from the residual reaction mixture.

References Cited in the file of this patent

UNITED STATES PATENTS

| | | |
|---|---|---|
| 2,862,957 | Siggel et al. | Dec. 2, 1958 |
| 2,932,662 | Ringwald | Apr. 12, 1960 |

OTHER REFERENCES

MacArdle: "Use of Solvents," pp. 1–3 (1925).